United States Patent [19]

Tago

[11] 4,389,646

[45] Jun. 21, 1983

[54] DISPLACEMENT CONVERTING CIRCUIT ARRANGEMENT

[75] Inventor: Keiichiro Tago, Kawasaki, Japan

[73] Assignee: Fuji Electric Co. Ltd., Kanagawa, Japan

[21] Appl. No.: 249,351

[22] Filed: Mar. 31, 1981

[30] Foreign Application Priority Data

Apr. 30, 1980 [JP] Japan .............................. 55-58128[U]
Apr. 30, 1980 [JP] Japan .............................. 55-58129[U]

[51] Int. Cl.³ ........................ G08C 19/10; G06G 7/20
[52] U.S. Cl. ............................ 340/870.37; 73/862.52; 324/60 R
[58] Field of Search .................. 340/870.37; 179/78 R, 179/78 A, 81 R; 73/141 R; 324/60 R, 61 R

[56] References Cited

U.S. PATENT DOCUMENTS 3,646,538 2/1972 Frick ............................... 340/870.37
4,250,490 2/1981 Dahlke ........................... 340/870.37

FOREIGN PATENT DOCUMENTS 53-16696 6/1978 Japan .

Primary Examiner—Thomas A. Robinson
Attorney, Agent, or Firm—Spencer & Kaye

[57] ABSTRACT

A displacement converting circuit arrangement comprising first and second capacitors in the form of a paired structure, at least one of the capacitors having a capacitance which is varied in response to a mechanical displacement. Means are provided for deriving first and second currents respectively proportional to the capacitances of the first and second capacitors, means for maintaining at least one of the DC currents corresponding to at least one capacitor having a variable capacitance at a fixed amount, and means for producing an output current corresponding to the difference between the DC currents, so that the output current indicates the amount of the mechanical displacement. Operation stability is improved by the simplified circuit arrangement, with consequent reduction in error and circuit failure. The movable electrode for varying the capacitance can withstand a heavy load.

14 Claims, 10 Drawing Figures

DISPLACEMENT CONVERTING CIRCUIT ARRANGEMENT

BACKGROUND OF THE INVENTION

The present invention relates to a displacement converting apparatus in which a mechanical displacement proportional to a load change which is proportional to a quantity of a measured value such as pressure difference, pressure or liquid level is detected in terms of a variation of capacitance, and the capacitance variation is converted into a corresponding electric signal which is transmitted to a receiving apparatus. More particularly, the invention relates to a displacement converting apparatus in which a pair of capacitors, the capacitances of which differentially change or one of the capacitances of which changes in response to a mechanical displacement, are used to produce the sum of and the difference between the capacitances of the capacitors. The sum and the difference are used to derive the amount of (capacitance difference)/(capacitance sum) as a ratio of the change of the capacitances, and then the ratio is converted into an electrical signal proportional thereto.

In a capacitor type displacement detector (a so-called ΔC cell), a diaphragm for detecting a load change proportional, for example, to a pressure difference ΔP is disposed at the middle position between electrodes, and a capacitance $C_1$ between the diaphragm and one electrode and a capacitance $C_2$ between the diaphragm and the other electrode are obtained as follows:

$$C_1 = \epsilon A/(d-\Delta d) \text{ and}$$

$$C_2 = \epsilon A/(d+\Delta d),$$

where $\epsilon$: dieleectric factor, A: electrode area, d: distance between electrode and diaphragm, and $\Delta d$: amount of diaphragm displacement. The sum and difference of these two capacitances are given as follows:

$$C_1 + C_2 = \epsilon A \cdot 2d/[d^2-(\Delta d)^2]$$

$$C_1 - C_2 = \epsilon A \cdot 2\Delta d/[d^2-(\Delta d)^2].$$

Therefore, the following equation is obtained.

$$(C_1 - C_2)/(C_1 + C_2) = \Delta d/d\alpha\Delta P$$

As seen from the above equation, a pressure difference ΔP may be detected by producing an electric signal proportional to $(C_1-C_2)/(C_1+C_2)$.

In a known capacitor type displacement converter disclosed in Japanese Patent Application Publication No. 16,696/1978 published on June 2, 1978, a DC voltage Vi proportional to the difference between a pair of capacitances $C_1$ and $C_2$ and a DC voltage Vr proportional to the sum of these capacitances $C_1$ and $C_2$ are detected. Then, $(C_1-C_2)/(C_1+C_2)$ is obtained by performing the division Vi/Vr.

In this displacement converter, DC currents detected by rectifying and smoothing AC currents proportional to the variations of capacitances $C_1$ and $C_2$ are applied to a differential amplifier to control the value of an AC voltage applied to the capacitances in a manner such that the sum of these DC currents is made equal to a reference DC current. In this situation, it is required to employ a stable reference voltage element in order to secure stably the amount of the reference DC current, and it is further required to add a constant current circuit to this displacement converter so that a current flowing in the reference voltage element is maintained at a constant amount. As a result, there are disadvantages in that the circuit configuration thereof is complicated, and causes of error and trouble are increased because of the complicated arrangement of the circuit. Accordingly, it has been desired but difficult to overcome these disadvantages.

Further, as described above, the displacement converter having a pair of capacitors which have a common electrode moved by mechanical displacement and the capacitances $C_1$ and $C_2$ of which are varied differentially so as to indicate the amount of the mechanical displacement by the ratio of the sum and the difference of these capacitances $C_1$ and $C_2$, has also a disadvantage in that it is difficult to impose the movable electrode for varying the capacitances $C_1$ and $C_2$ on a heavy load such as a pressure gauge, a load cell or the displacer of a floating type liquid level gauge.

SUMMARY OF THE INVENTION

An object of the present invention is to provide a displacement converting circuit arrangement in which the above-mentioned conventional defects are removed and a comparable stability can be obtained by a highly simplified circuit configuration in comparison with that of the conventional circuit arrangement, as well as a circuit in which the causes of error and trouble are reduced.

Another object of the present invention is to provide a displacement converting circuit arrangement in which a mechanical displacement is converted to an electric signal by capacitances, and in which a movable electrode moving in response to the mechanical displacement can be burdened with a heavy load.

In order to achieve these objects, a displacement converting circuit arrangement according to the present invention is provided with first and second impedance elements, which have a paired structure and an impedance of at least one of which is varied in response to a mechanical displacement, means for deriving first and second DC currents respectively proportional to the impedances of the first and second impedance elements, means for maintaining at least one of the first and second DC currents at a fixed amount, whereby at least one of the first and second DC currents corresponds to at least one of the impedance elements having a varied impedance, and means for producing an output current corresponding to the difference between the first and the second DC currents, so that the output current indicates the amount of mechanical displacement.

In one aspect of the present invention, both first and the second impedance elements are differentially varied in response to the mechanical displacement, whereby a current corresponding to the sum of the first and second DC currents which are respectively proportional to the impedances of the first and second impedance elements flows through a field effect transistor so that the sum current is maintained at a constant amount. The first and second DC currents are supplied to a differential amplifier, the output of which is applied to an output transistor, so that an output current corresponding to the difference between the first and second DC currents is derived.

It is preferable that a movable electrode be disposed between two fixed electrodes opposed to each other, so that the movable electrode and the two fixed electrodes form respectively first and second capacitors corresponding respectively to the first and second impedance elements. To the first and second capacitors a half wave of an alternating current signal is applied respectively through first and second diodes, and the other half wave of the alternating current signal is applied respectively through third and fourth diodes with a polarity opposite that of the first and second diodes, and the first and second DC currents are applied respectively to first and second resistor circuits, the output voltages of which are applied to the differential amplifier. In addition, a resistor through which the sum current flows is connected between the source and the gate electrodes of the field effect transistor.

In another aspect of the present invention, only the second impedance element is varied in response to the mechanical displacement. The first and second DC currents which are respectively proportional to the impedances of the first and second impedance elements are supplied to a field effect transistor, so that the second DC current flowing through the second impedance element is maintained at a constant value, and the first and second DC currents are supplied to a differential amplifier, the output of which is applied to an output transistor, so that an output current corresponding to the difference between the first and second DC currents is derived.

It is preferable that the first and second impedance elements consist respectively of a first capacitor formed by two fixed electrodes and a second capacitor formed by one of the two fixed electrodes and a movable electrode. To the first and the second capacitors is applied a half wave of an alternating current signal through respective first and second diodes, as well as the other half wave of the alternating current signal through respective third and fourth diodes arranged with a polarity opposite that of the first and second diodes. The first and second DC currents are supplied respectively to first and second resistor circuits, the output voltages of which are applied to the differential amplifier. A resistor through which the second DC current flows is connected between the source and the gate electrodes of the field effect transistor.

In addition, it is preferable that a zero adjusting circuit be connected to two inputs terminals of the differential amplifier, whereby the output current is set to a predetermined value in response to the impedances of the first and second impedance elements.

It is also preferable that a part of the output current be fed back to a feed back resistor connected to one of the input terminals of the differential amplifier through a variable resistor, the resistance of which is varied to adjust the range of the variation of the output current, which variation corresponds to that of the mechanical displacement.

In the preferred embodiment of the invention described above, the output transistor may be connected to an output resistor and the variable resistor may be connected between the output resistor and the feed back resistor, whereby the resistances of the output resistor and the feed back resistor are selected in such a way that a feed back current does not flow through the variable resistor at the initial point of measurement in the input range of displacement conversion.

Further, it is also preferable that the zero adjusting circuit has a differential resistor connected between two input terminals of the differential amplifier and a second field effect transistor having a self bias resistor and connected to an adjusting terminal of the differential resistor, whereby a zero adjusting current is supplied to the second field effect transistor.

Furthermore, it is also preferable that a part of the output current derived from the differential amplifier be fed back to the second resistor circuit through the variable resistor.

DESCRIPTION OF THE PREFERRED EMBODIMENT

Figure 1A:
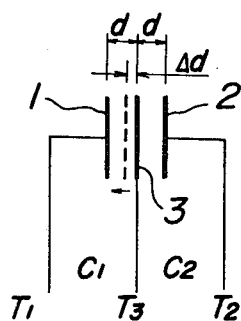
FIG. 1A is a diagram showing the fundamental configuration of a pair of impedance elements employed in one aspect of a displacement converting circuit arrangement according to the present invention.
Figure 1B:
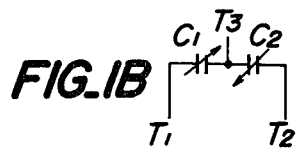
FIG. 1B is a circuit diagram showing an electrical equivalent circuit thereof.

A fundamental configuration of a pair of impedance elements employed in a first aspect of a displacement converting circuit arrangement according to the present invention is shown in FIGS. 1A and 1B. In this configuration, first and second impedance elements consist of first and second capacitors $C_1$ and $C_2$ which are formed by fixed electrodes 1 and 2 opposed to each other and a movable electrode 3 disposed therebetween. Electrodes 1, 2 and 3 are connected to terminals $T_1$, $T_2$ and $T_3$, respectively. An electrical equivalent circuit of capacitors $C_1$ and $C_2$ shown in FIG. 1A is shown in FIG. 1B.

In this equivalent circuit, the capacitors $C_1$ and $C_2$ are expressed by the following equations:

$$C_1 = \epsilon A/(d - \Delta d)$$

$$C_2 = \epsilon A/(d + \Delta d),$$

where d is the distance between the electrodes and the diaphragm when $P_1$ equals $P_2$ (initial condition); $\Delta d$ is the amount of the displacement of the diaphragm; A is the area of the electrodes and $\epsilon$ is the dielectric factor.

The ratio of the difference between the capacitances of capacitors $C_1$ and $C_2$ to the sum of the capacitances of capacitors $C_1$ and $C_2$ is $$(C_1 - C_2)/(C_1 + C_2) = \Delta d/d$$

Figure 2:
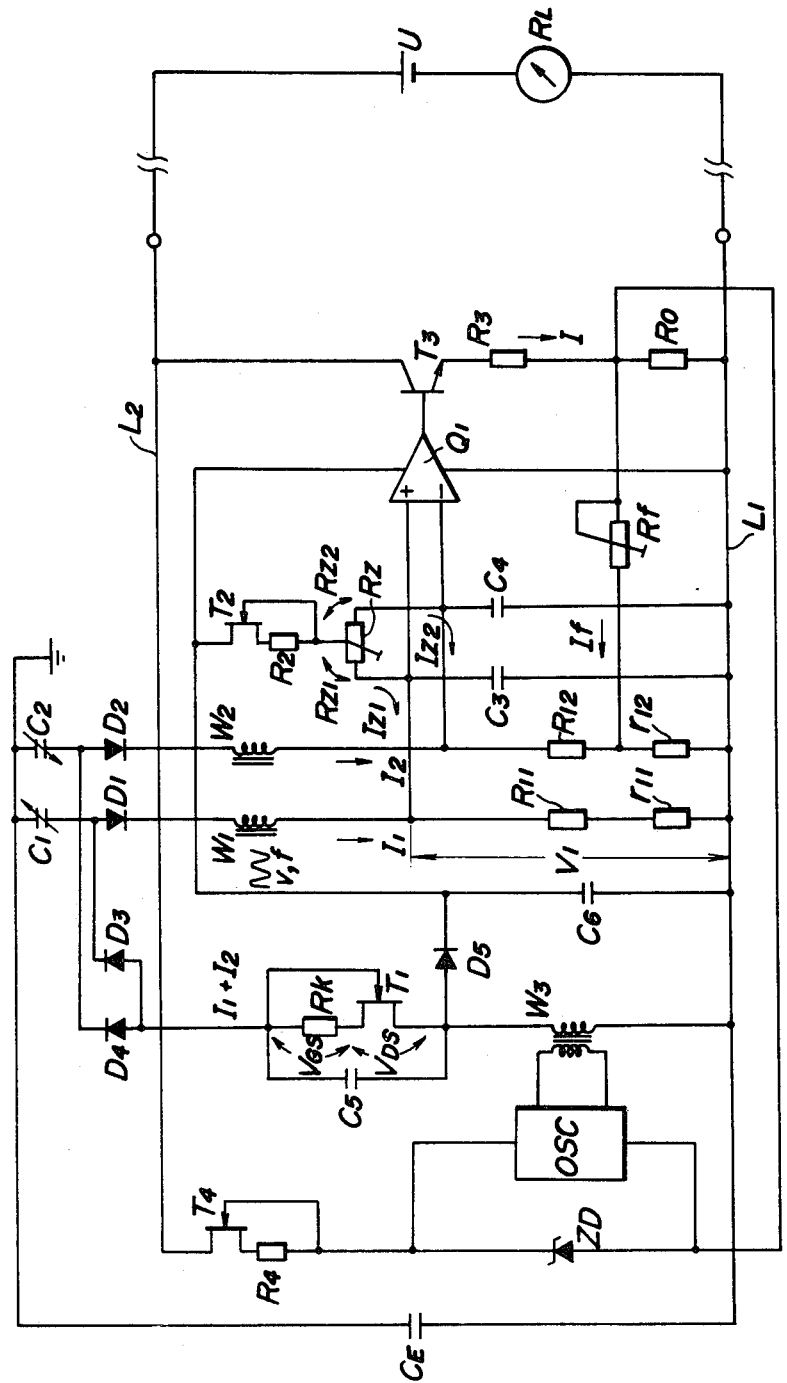
FIG. 2 is a circuit diagram showing an embodiment of a displacement converting circuit arrangement according to the present invention, in which the pair of impedance elements shown in FIG. 1A is employed.

Thus, the ratio of the difference between the capacitances of the capacitors and the sum of the capacitances is proportional to the displacement $\Delta d$ and, therefore, to the pressure difference $\Delta p$. An embodiment of a displacement converting circuit arrangement according to the present invention employing the pair of capacitors shown in FIGS. 1A and 1B is shown in FIG. 2. In FIG. 2, an AC voltage derived from an oscillator OSC is applied, via secondary windings $W_1$, $W_2$ and $W_3$ of a transformer and through diodes $D_3$ and $D_4$, to the pair of capacitors $C_1$ and $C_2$ varying differentially in response to the displacement of the movable electrode caused by a load, at every half wave of the AC voltage. A pair of AC currents varying in response to the variation of those capacitors are rectified and smoothed by diodes $D_1$ and $D_2$ and capacitors $C_3$ and $C_4$ to obtain a pair of DC currents $I_1$ and $I_2$. These two DC currents $I_1$ and $I_2$ flow respectively through resistor circuits consisting respectively of series connections of resistors $R_{11}$ and $R_{12}$ having a resistance $R_1$ and resistors $r_{11}$ and $r_{12}$ having a resistance $r_1$. The terminals of the resistors $r_{11}$ and $r_{12}$ which are remote from the resistors $R_{11}$ and $R_{12}$ are connected to a power source line $L_1$. The secondary winding $W_3$ is connected also to the drain of a field effect transistor (FET) $T_1$, the source of which is connected commonly to the anodes of the diodes $D_3$ and $D_4$ through a resistor $R_k$, as well as to the gate of the FET $T_1$. A capacitor $C_5$ is connected between the source and the drain of the FET $T_1$.

Further, the drain current of the FET $T_1$ is rectified by a diode $D_5$ and smoothed by a capacitor $C_6$ to obtain a DC voltage which is applied to the source of an FET $T_2$ and the power source terminal of a differential amplifier $Q_1$. The drain of the FET $T_2$ is connected through a resistor $R_2$ to an adjustable terminal of a variable differential resistor $R_z$. One of the terminals of the resistor $R_z$ is connected to one terminal of the resistor $R_{11}$ and one terminal of the capacitor $C_3$ as well as to one of the input terminals of the differential amplifier $Q_1$.

The other terminal of the resistor $R_z$ is connected to one terminal of the resistor $R_{12}$ and one terminal of the capacitor $C_4$ as well as to the other input terminal of the differential amplifier $Q_1$. The other terminals of the capacitors $C_3$ and $C_4$ are connected to the power source line $L_1$. The resistance between the one terminal and the adjustable terminal of the resistor $R_z$ is denoted by $R_{z1}$, while the other resistance between the other terminal and the adjustable terminal of the resistor $R_z$ is denoted by $R_{z2}$. Further, the total resistance of the resistor $R_z$ is expressed by $R_z = R_{z1} + R_{z2}$.

The output terminal of the differential amplifier $Q_1$ is connected to the base of an output transistor $T_3$, the collector of which is connected to a power source line $L_2$, and the emitter of which is connected to the power source line $L_1$ through a resistor $R_3$ and a load resistor $R_0$. The connection point between the resistors $R_3$ and $R_0$ is connected to the connection point between the resistors $R_{12}$ and $r_{12}$ through a feed back variable resistor $R_f$.

An external DC voltage source U is connected between the power source lines $L_1$ and $L_2$ through an external load resistor $R_L$ representing a recorder, an indicator or the like. A constant current circuit consisting of a Zener diode ZD, a resistor $R_4$ and an FET $T_4$ is connected between the power source line $L_2$ and the connection point of the resistors $R_3$ and $R_0$. The gate of the FET $T_4$ is connected to the connection point of the resistor $R_4$ and the Zener diode ZD, so that the constant voltage obtained across the Zener diode ZD is applied to the oscillator OSC. In this arrangement, even if the voltage of the DC voltage source U is varied, the voltage across the FET $T_4$ is varied by the self-bias action thereof so as to compensate for voltage variations in the DC voltage source U, and consequently a constant current flows continuously through the Zener diode ZD. As a result, the oscillation output signal of the oscillator OSC is not affected by variations of the DC voltage source U. A capacitor $C_E$ connected between the power source conductor $L_1$ and ground potential is provided for blocking any DC voltage component.

For example, with respect to the capacitor $C_1$ among the capacitors provided as the impedance elements, the AC voltage applied to the capacitor $C_1$ is obtained by subtracting the DC voltage drop $V_1$ across the series connection of the resistors $R_{11}$ and $r_{11}$ from the AC voltage $V_{o-p}$ derived from the secondary winding $W_1$ of the transformer during the positive half wave, while the above AC voltage is obtained by subtracting the voltage $V_{DS}$ across the drain and source of the FET $T_1$ and the load voltage drop $V_{GS}$ across the gate and source thereof from the AC voltage $V_{o-p}$ derived from the secondary winding $W_3$ of the transformer in the negative half wave. Accordingly, the DC current $I_1$ corresponds to the product of the capacitance $C_1$, the AC voltage applied to the capacitor $C_1$ and the frequency f of the AC voltage, as expressed by the following equation:

$$I_1 = C_1 \cdot [V_{p-p} - (V_{DS} + V_{GS} + V_1)] \cdot f \qquad (1).$$

Similarly, the DC current $I_2$ is expressed by the following equation:

$$I_2 = C_2 \cdot [V_{p-p} - (V_{DS} + GS + V_1)] \cdot f \qquad (2).$$

The difference between these DC currents $I_1$ and $I_2$ is detected as a difference between DC voltages produced across the respective pairs of series connections of resistors $(R_{11} + r_{11})$ and $(R_{12} + r_{12})$, and is converted to the output current I by the differential amplifier $Q_1$ and the output transistor $T_3$. This output current I is fed back to the detection resistor $r_{12}$ through the load resistor $R_0$ of the output transistor $T_3$ and the feed back resistor $R_f$ of the differential amplifier $Q_1$. As a result, the potential difference appearing between the pair of input terminals of the differential amplifier $Q_1$ becomes substantially zero. Consequently, the following equation is obtained:

$$I_1 \cdot (R_1 + r_1) = I_2 \cdot (R_1 + r_1) + I_f \cdot r_1$$

where the current $I_f$ is the current flowing through the feed back resistor $R_f$. In the closed circuit consisting of the resistors $R_0$, $R_f$ and $r_{12}$, the current $(I - I_f)$ flows through the output load resistor $R_0$, while the current $(I_2 + I_f)$ flows through the detection resistor $r_{12}$, and further the current $I_f$ flows through the feed back resistor $R_f$. Consequently, the following equation is obtained:

$$I_2 \cdot r_1 + I_f \cdot (r_1 + R_f) = (I - I_f) \cdot R_0.$$

Hence, this equation is modified as follows:

$$I_f = (I \cdot R_0 - I_2 \cdot r_1) / (r_1 + R_f + R_0).$$

The following equation (3) is obtained by arranging the relations between these equations:

$$(I_1-I_2)(R_1+r_1)+I_2\cdot r_1\cdot r_1/(r_1+R_f+R_0)=I\cdot R_0\cdot r_1/(r_1+R_f+R_0) \quad (3).$$

Then, the following equation is derived by substituting equation (3) by equations (1) and (2):

$$f\cdot[V_{p-p}-(V_{DS}+V_{GS}+V_1)](C_1-C_2)(R_1+r_1)+f\cdot[V_{p-p}-(V_{DS}+V_{GS}+V_1)]C_2\cdot r_1\cdot r_1/(r_1+R_f+R_0)=I\cdot R_0\cdot r_1/(r_1+R_f+R_0) \quad (4).$$

On the other hand, the sum of the DC currents $I_1$ and $I_2$ is kept at a constant amount by automatically regulating the voltage across the FET $T_1$ which is self-biased by the resistor $R_k$. When this constant amount of the sum current is assumed to be $I_k$, the following equation is derived:

$$I_1 + I_2 = f\cdot[V_{p-p} - (V_{DS} + V_{GS} + V_1)](C_1 + C_2) \quad (5)$$
$$= I_k.$$

This equation (5) can be modified as follows.

$$f\cdot[V_{p-p}-(V_{DS}+V_{GS}+V_1)]=I_k/(C_1+C_2) \quad (6)$$

If equation (4) is substituted by equation (6), the following equation (7) is obtained.

$$I_k\cdot(R_1+r_1)\cdot(C_1-C_2)/(C_1+C_2)+I_k\cdot r_1\cdot r_1\cdot C_2/[(r_1+R_f+R_0)\cdot(C_1+C_2)]$$
$$=I\cdot R_0\cdot r_1/(r_1+R_f+R_0) \quad (7)$$

On the other hand, if each of the pairs of the capacitors $C_1$ and $C_2$ has an electrode area A, the distance d between the electrodes, the increment $\Delta d$ of the distance d due to mechanical displacement and a dielectric factor $\epsilon$, the pair of capacitors $C_1$ and $C_2$ are expressed as follows:

$$C_1=\epsilon A/(d-\Delta d) \quad (8)$$
$$C_2=\epsilon A/(d+\Delta d) \quad (9).$$

The amount of mechanical displacement, that is, the increment $\Delta d$ of the electrode distance d and the output current I have the following relationship which is obtained by substituting equation (7) by equations (8) and (9):

$$(C_1 - C_2)/(C_1 + C_2) = \Delta d/d$$
$$C_2/(C_1 + C_2) = (1 - \Delta d/d)/2$$
$$I_k(R_1 + r_1)\Delta d/d + I_k\cdot r_1\cdot r_1(1 - \Delta d/d)/[2(r_1 + R_f + R_0)] =$$
$$I\cdot R_0\cdot r_1/(r_1 + R_f + R_0)$$

These equations can be arranged as follows:

$$I=I_k\cdot r_1/2R_0+[I_k\{(r_1+R_f+R_0)(R_1+r_1)/(R_0\cdot r_1)-r_1/2R_0\}]\Delta d/d \quad (10).$$

In equation (10), the first term on the right side thereof is a constant term. The portion inside [ ] of the second term and d are also constants. As a result, the output current I is recognized to be proportional to the amount $\Delta d$ of the mechanical displacement.

Further, the initial value of the output current I can be adjusted suitably by the zero adjusting circuit consisting of the FET $T_2$, the load resistor $R_2$ and the variable resistor $R_z$, and connected to the input terminals of the differential amplifier $Q_1$.

The above zero adjusting circuit is provided for maintaining the input voltage difference of the differential amplifier $Q_1$ at zero by varying the ratio of the division of the variable resistor to change the amount of zero adjusting current $I_{z1}$, when the input voltage difference can not be adjusted to zero for some reason, since the input voltage difference should be zero when the pair of capacitances $C_1$ and $C_2$ are equal to each other ($C_1=C_2$), that is, $I_1=I_2$.

The displacement converting circuit arrangement of this kind is used mainly as a two line type signal transmitter. For that purpose, it is required for the two line type signal transmitter that the range of variation of the output signal, namely, the conversion output current I is standardized to be in the range from 4 mA to 20 mA or a range from 10 mA to 50 mA, when the input signal, namely, the mechanical displacement varies from 0% to 100%. Accordingly, in order for the circuit arrangement of the present invention to be in conformity with this unified range, a conversion output range adjusting circuit is required in addition to the above-mentioned zero adjusting circuit. As is apparent from the above equation (10), in order to adjust the conversion output range, it is necessary that either one of the constant current $I_k$, the detection resistor $r_{12}$, the feed back resistor $R_f$ or the conversion output load resistor $R_0$ be made adjustable in accordance with the increment $\Delta d$ of the electrode distance d of the capacitor within the range of variation of the mechanical displacement as the input signal. With this in view, the embodiment of a circuit arrangement according to the present invention which is shown in FIG. 2 has the feed back resistor $R_f$ in the form of a variable resistor.

When the feed back resistor $R_f$ of the operational amplifier $Q_1$ is used for adjusting the conversion output range, it is possible to keep the zero point conversion output current constant at the time of the adjustment of the conversion output current range. Namely, the zero adjustment and the conversion output range adjustment can be performed independently without interaction therebetween, so that the adjustment operation for changing the measuring range or the like is greatly facilitated in comparison with the conventional apparatus.

When it is assumed that the conversion output current I is varied within a range from 4 mA to 20 mA in response to the variation of the mechanical displacement input within a range from 0% to 100%, the output current I of 4 mA flows through the output resistor $R_0$ when the input displacement is 0%. On the other hand, the current $(I_2+I_f)$ and the zero adjusting current $I_{z2}$ flow through the detection resistor $r_{12}$. The DC current $I_2$ and the zero adjusting current $I_{z2}$ are predetermined respectively at given values from a viewpoint of their functions. If the resistances of the resistors $R_0$ and $r_{12}$ are set such as $$4\text{ mA}\times R_0=(I_2+I_{z2})\cdot r_1,$$

the feed back current $I_f$ becomes $I_f=0$, since the potentials at both terminals of the feed back resistor are equal to each other when the input displacement is 0%. Once this situation is obtained, the output current I is not varied by the adjustment of the range of the output current regardless of the resistance of the feed back resistor $R_f$. Even if the resistance of the feed back resistor $R_f$ is varied so that the output current I becomes 20 mA when the input displacement is 100%, the output current I returns to the value of 4 mA again when the input displacement returns to 0%. Thus, it is sufficient to perform each of these adjustments only once.

Further, in order to adjust the variation of the output current I to be within a range from 10 mA to 50 mA in accordance with the range from 0% to 100% of the input displacement, the output load resistor $R_0$ and the detection resistor $r_{12}$ are adjusted in such a way that the following equation is obtained:

$$10\ mA \times R_0 = (I_2 + I_{z2}) \cdot r_1.$$

As is apparent from the above explanation, in the displacement converting circuit arrangement shown in FIG. 2 according to the present invention, the sum of the DC currents corresponding to the variation of the differential capacitance to be measured is controlled by the voltage across the field effect transistor through which the sum current flows, so that the sum current is maintained at a constant value. Accordingly, the provision of a reference voltage element, a constant current circuit or the like is not required.

The above-mentioned reduction of the circuit elements leads to fewer causes of error and failure as well as the improvement of performance and stability of the displacement conversion operation. The reason follows. In the case that the displacement converting circuit arrangement is used as a two line type signal transmitter in which the power supply and the signal transmission are carried out by common transmission lines, the whole circuit arrangement should be operated by supplying a current less than 4 mA when the range of variation of the output current is from 4 mA to 20 mA. In this connection, if the number of circuit elements is reduced, sufficient operating current is supplied to the respective circuit elements, so that the performance and stability of the operation is improved.

Figure 3:
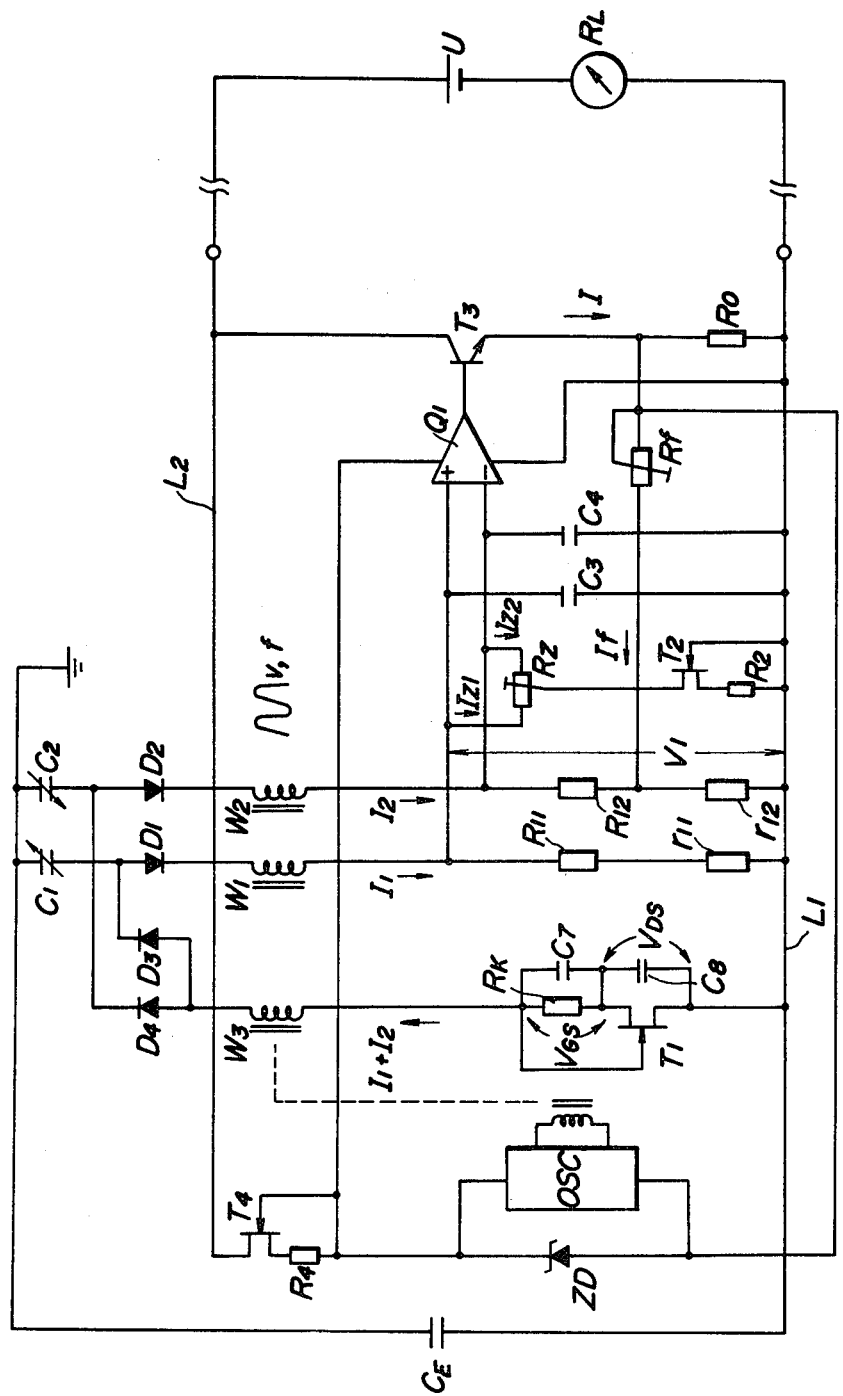
FIG. 3 is a circuit diagram showing a modification of the circuit arrangement shown in FIG. 2.

Now, another embodiment of a displacement converting circuit arrangement according to the present invention in which the pair of capacitors shown in FIGS. 1A and 1B are employed is shown in FIG. 3. In FIG. 3, the same reference numerals as in FIG. 2 are allotted to like portions, the explanations of which are omitted.

In this embodiment, the series connection of the secondary winding $W_3$ and the FET $T_1$ arranged between the power source lines $L_1$ and $L_2$ is arranged in an order opposite to that shown in FIG. 2, and capacitors $C_7$ and $C_8$ are connected respectively between the gate and the source and between the source and the drain of the FET $T_1$.

In the embodiment shown in FIG. 2, the AC voltage supplied by the secondary winding $W_3$ is rectified and smoothed by the diode $D_5$ and the capacitor $C_6$, and the thus obtained DC voltage is used for the power source of the differential amplifier $Q_1$. In contrast, in the embodiment shown in FIG. 3, the constant DC voltage derived from the Zener diode ZD is used for the supply voltage of the differential amplifier $Q_1$. If it is required to widen the dynamic range of the differential amplifier $Q_1$, the circuit shown in FIG. 2 may be used for the power source of the differential amplifier $Q_1$. In this case, however, ripples exist in the supply voltage. Additionally, in the embodiment shown in FIG. 2, the current consumption in the differential amplifier $Q_1$ is multiplied by the winding ratio (n) between the primary winding and the secondary winding $W_3$ of the output transformer of the oscillator OSC, so that the operation current of the whole circuit arranged is increased, although it should be less than 4 mA, when the minimum amount of the signal is selected in a range from 4 mA to 20 mA. In contrast, in the embodiment shown in FIG. 3, although the dynamic range of the differential amplifier $Q_1$ is narrowed, ripples do not exist in the supply voltage and further the operation current of the whole circuit arrangement can be less than that in the embodiment shown in FIG. 2.

Furthermore, while in the embodiment shown in FIG. 2, the rectified current from the secondary winding $W_3$ is supplied to the FET $T_2$ forming the zero adjusting circuit, in the embodiment shown in FIG. 3, the DC currents $I_1$ and $I_2$ derived from the secondary windings $W_1$ and $W_2$ are supplied not only to the detection resistors $R_{11}$, $r_{11}$ and $R_{12}$, $r_{12}$, but also to the zero adjusting circuit. In the embodiment shown in FIG. 2, the current n $(I_{z1} + I_{z2})$ forms the operation current of the zero adjusting circuit and it follows that the total operation current becomes large. However, the voltage applied to the FET $T_2$ can be increased, so that the FET $T_2$ itself can be operated in a sufficiently stable region. On the other hand, in the present embodiment, the zero adjusting circuit is operated in the range of voltages across the series connections of the resistors $R_{11}$ and $r_{11}$, and $R_{12}$ and $r_{12}$. As a result, as far as the dynamic range of the FET $T_2$ is concerned, the embodiment shown in FIG. 3 is more disadvantageous than that shown in FIG. 2, but the present embodiment can prevent the increase of the operation current of the zero adjusting circuit.

In the embodiment shown in FIG. 2, the conversion equation involving the zero adjusting currents $I_{z1}$ and $I_{z2}$ can be expressed as follows:

$$(I_1 + I_2)(R_1 + r_1) = (I_2 + I_{z2})(R_1 + r_1) + I_f \cdot r_1$$

$$(I_2 + I_{z2})r_1 + I_f(r_1 + R_f) = (I - I_f) \cdot R_0.$$

Accordingly, the following equation can be obtained:

$$I_f = [I \cdot R_0 - (I_2 + I_{z2})r_1]/(r_1 + R_f + R_0).$$

Further, the following equation can be derived by arranging the above equations:

$$[(I_1 - I_2)(R_1 + r_1) + I_2 \cdot r_1 \cdot r_1/(r_1$$

$$+ R_f + R_0)] + [(I_{z1} - I_{z2})(R_1 + r_1) + I_{z2} \cdot r_1 r_1/(r_1$$

$$+ R_f + R_0)] = I \cdot R_0 \cdot r_1/(r_1 + R_f + R_0) \quad (3)'$$

If equation (3)' is compared with equation (3), it can be recognized that the second term of the left side of equation (3)' is newly added to equation (3). This second term is added for setting the currents $I_{z1}$ and $I_{z2}$ such that the initial amounts of the currents $I_1$ and $I_2$ correspond to that of the output current I. The second term is not affected by the currents I, $I_1$ and $I_2$.

In contrast, in the embodiment shown in FIG. 3, the following equations can be obtained:

$$(I_1-I_{z1})(R_1+r_1)=(I_2-I_{z2})(R_1+r_1)+I_f r_1$$

$$(I_2-I_{z2})r_1+I_f(r_1+R_1)=(I-I_f)\cdot R_0.$$

Accordingly, the following equation can be obtained:

$$I_f=[I\cdot R_0-(I_2-I_{z2})\cdot r_1]/(r_1+R_f+R_0)$$

Then, the following equation (3)″ can be derived by arranging the above equations:

$$[(I_1-I_2)(R_1+r_1)+I_2\cdot r_1\cdot r_1/(r_1+R_f+R_0)]$$

$$-[(I_{z1}-I_{z2})(R_1+r_1)+I_{z2}\cdot r_1\cdot r_1/(r_1+R_f+R_0)]$$

$$=I\cdot R_0\cdot r_1/(r_1+R_f+R_0) \qquad (3)''$$

Figure 4A:
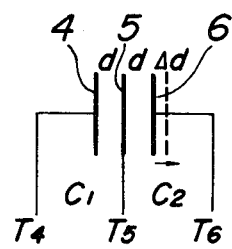
FIGS. 4A and 5A are diagrams showing the fundamental configuration of a pair of impedance elements employed in another aspect of the displacement converting circuit arrangement according to the present invention.
Figure 4B:
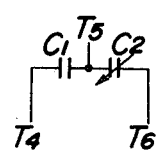
FIGS. 4B and 5B are circuit diagrams showing electrical equivalent circuits, respectively corresponding to FIGS. 4A and 4B.
Figure 5A:
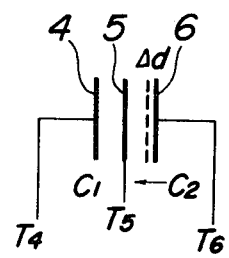

Next, FIGS. 4A and 4B and 5A and 5B illustrate the configurations and equivalent circuits of a pair of impedance elements in another aspect of a displacement converting circuit arrangement according to the invention. In this embodiment, the first and the second impedance elements consist respectively of the capacitor $C_1$ formed by fixed electrodes 4 and 5 and the capacitor $C_2$ formed by the fixed electrode 5 and a movable electrode 6 opposed thereto. The electrodes 4, 5 and 6 are connected respectively to the terminals $T_4$, $T_5$ and $T_6$. The electrical equivalent circuits of the capacitors $C_1$ and $C_2$ shown in FIGS. 4A and 5A are shown respectively in FIGS. 4B and 5B.

Figure 5B:
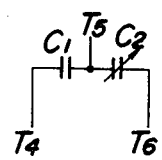

In a displacement converting circuit arrangement according to the present invention which employs the pair of capacitors formed as mentioned above, the manner of conversion from the mechanical displacement to the electric signal by way of the variation of capacitance is shown in FIGS. 4A and 4B when the variable capacitance is decreased by the mechanical displacement, and also shown in FIGS. 5A and 5B, when the variable capacitance is increased by the mechanical displacement.

If it is assumed that the area of electrodes of the fixed and the movable capacitors $C_1$ and $C_2$ is A, the distance between those electrodes is d, the increment of the distance d is $\Delta d$ and the dielectric factor is $\epsilon$, the following equations can be obtained in case of FIGS. 4A and 4B:

$$C_1 = \epsilon A/d, \quad C_2 = \epsilon A / (d + \Delta d)$$

$$C_1 - C_2 = \epsilon A \cdot \Delta d / [d(d + \Delta d)]$$

$$= [\epsilon A / (d + \Delta d)] \cdot \Delta d / d$$

Hence, $$(C_1 - C_2) / C_2 = \Delta d / d$$

$$\Delta d \propto (C_1 - C_2) / C_2.$$

In case of FIGS. 5A and 5B, the following equations can be obtained:

$$C_1 = \epsilon A/d, \quad C_2 = \epsilon A / (d - \Delta d)$$

$$C_2 - C_1 = \epsilon A \cdot \Delta d / [d(d - \Delta d)]$$

$$= [\epsilon A / (d - \Delta d)] \cdot \Delta d / d.$$

Hence, $$(C_2 - C_1) / C_2 = \Delta d/d.$$

-continued $$\Delta d \propto (C_2 - C_1) / C_2.$$

In each of the above cases, the increment $\Delta d$ of variation of the distance d between electrodes, which corresponds to the mechanical displacement, is proportional to the ratio between the capacitance difference $C_1 \sim C_2$ and the variable capacitance $C_2$.

Figure 6:
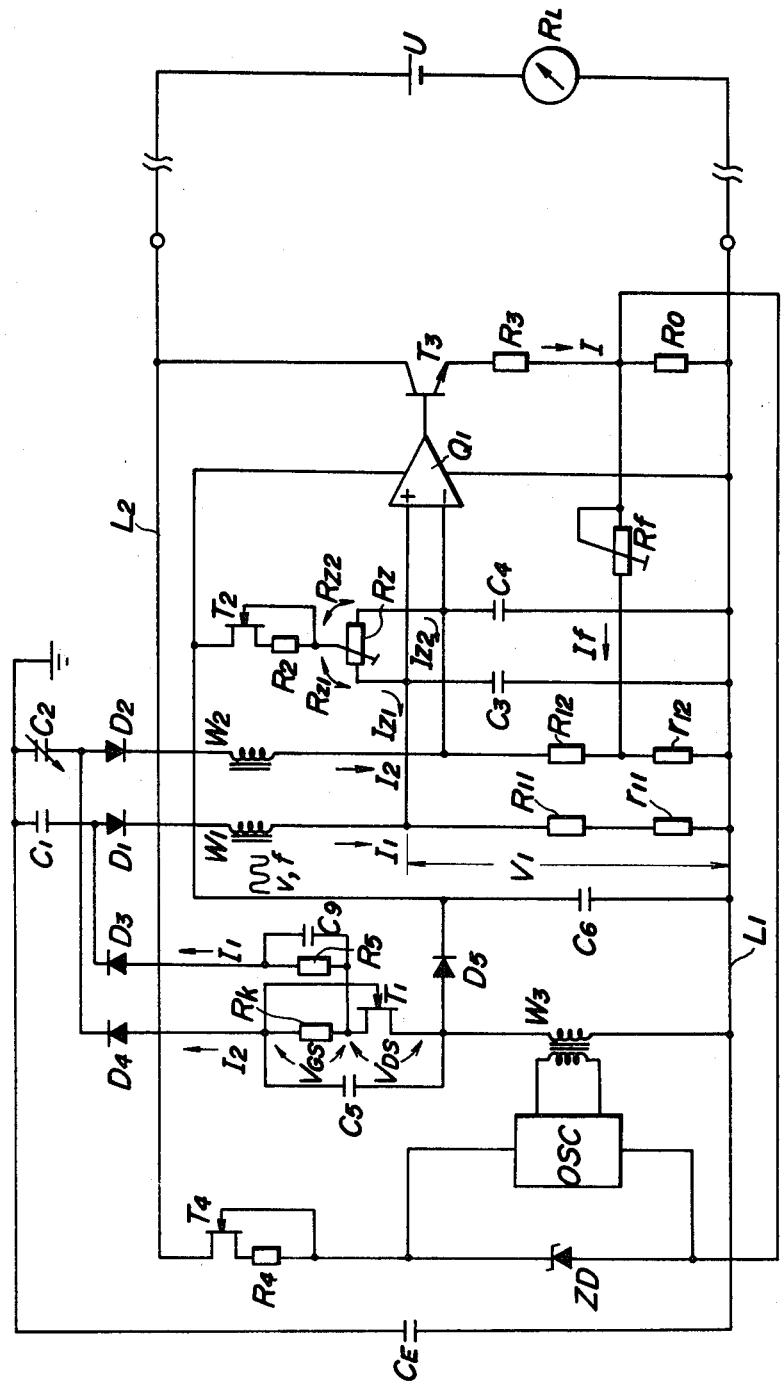
FIG. 6 is a circuit diagram showing an embodiment of a displacement converting circuit arrangement according to the present invention, in which the pair of impedance elements shown in FIGS. 4A and 4B are employed.

An embodiment of a displacement converting circuit arrangement according to the present invention, which employs the pair of capacitors $C_1$ and $C_2$ formed as shown in FIGS. 4A and 4B is shown in FIG. 6. In FIG. 6, the portions similar to those shown in FIG. 2 are denoted by the same reference numerals as in FIG. 2, and the explanations for these portions are omitted.

When the AC voltages derived from the oscillator OSC and having the frequency f is applied to the capacitors $C_1$ and $C_2$ to be measured through the secondary windings $W_1$, $W_2$ and $W_3$ of the output transformer, the DC currents $I_1$ and $I_2$ corresponding respectively to the impedances of the capacitors $C_1$ and $C_2$, which are rectified and smoothed by the diodes $D_1$ and $D_2$ and the capacitors $C_3$ and $C_4$, respectively, flow respectively through the series connections of the resistors $R_{11}$ and $r_{11}$, and $R_{12}$ and $r_{12}$.

With respect to the fixed capacitor $C_1$, the AC voltage applied thereto corresponds to the difference obtained by subtracting the DC voltage drop $V_1$ across the resistors $R_{11}$ and $r_{11}$ from the AC voltage $V_{o-p}$ appearing at the secondary winding $W_3$ for the positive half wave. The AC voltage also corresponds to the difference obtained by subtracting the sum of the voltages $V_{DS}$ between the drain and the source of the FET $T_1$ and the voltage $V_{GS}$ between the gate and the source thereof from the AC voltage $V_{o-p}$ appearing at the secondary winding $W_3$ for the negative half wave. Accordingly, the DC current $I_1$ flowing through the fixed capacitor $C_1$ becomes equal to the product of the capacitance $C_1$, the applied voltage and the frequency f and is expressed as follows:

$$I_1 = C_1[V_{p-p}-(V_{DS}+V_{GS}+V_1)]\cdot f \qquad (11).$$

Similarly, the DC current $I_2$ flowing through the movable capacitor $C_2$ is expressed as follows:

$$I_2 = C_2\cdot[V_{p-p}-(V_{DS}+V_{GS}+V_1)]\cdot f \qquad (12).$$

Here, the AC voltage $V_{o-p}$ indicates a half-wave peak value, and the AC voltage $V_{p-p}$ indicates a full-wave peak to peak value.

The difference between these DC currents $I_1$ and $I_2$ is detected as the difference between the DC voltages produced respectively across the resistors $(R_{11}+r_{11})$ and $(R_{12}+r_{12})$, and then is converted to the output current I by the output transistor $T_3$ through the differential amplifier $Q_1$. This output current I is fed back to the detection resistor $r_{12}$ through the load resistor $R_0$ and the feed back resistor $R_f$. As a result, the feed back control is carried out in such a way that the potential difference appearing between the input terminals of the differential amplifier $Q_1$ becomes substantially zero. Accordingly, the following equation is established:

$$I_1\cdot(R_1+r_1)=I_2\cdot(R_1+r_1)+I_f r_1.$$

In addition, in the closed circuit consisting of the resistors $R_0$, $R_f$ and $r_{12}$, the current $I-I_f$ flows through the output resistor $R_0$, the current $I_2+I_f$ flows through the resistor $r_{12}$, and the current $I_f$ flows through the resistor $R_f$, so that the following equation is obtained:

$$I_2 \cdot r_1 + I_f(r_1+R_f) = (I-I_f) \cdot R_0.$$

Accordingly, $$I_f = (I \cdot R_0 - I_2 \cdot r_1)/(r_1+R_f+R_0).$$

The following equation (13) is derived by rearranging these equations:

$$(I_1-I_2)(R_1+r_1) + I_2 \cdot r_1 \cdot r_1/(r_1+R_f+R_0) = I \cdot R_0 \cdot r_1/(r_1+R_f+R_0) \qquad (13).$$

Further, the following equation is obtained by substituting equation (13) by equations (11) and (12):

$$f \cdot [V_{p-p} - (V_{DS}+V_{GS}+V_1)](C_1-C_2)(R_1+r_1)$$

$$+ f \cdot [V_{p-p} - (V_{DS}+V_{GS}+V_1)] \cdot C_2 \cdot r_1 \cdot r_1/(r_1+R_f+R_0)$$

$$= I \cdot R_0 \cdot r_1/(r_1+R_f+R_0) \qquad (14).$$

On the other hand, the circuit consisting of the FET $T_1$, which connects the secondary winding $W_3$ with the pair of capacitors $C_1$ and $C_2$ through the diodes $D_3$ and $D_4$, is operated as follows.

The drain current of the FET $T_1$, namely, the current $I_1+I_2$ is determined by the gate-drain voltage $V_{GS}$, which is equal to $I_2 \times R_k$. When the current $I_2$ is decreased due to the decrease of the variable capacitor $C_2$, the FET $T_1$ operates in such a manner that the voltage $V_{GS}$ is lowered and the drain current $I_1+I_2$ is increased. As a result, the drain-source voltage $V_{DS}$ of the FET $T_1$ is lowered, and therefore the amount in [] in the right side of equation (12) is increased, so that the voltage to be applied to the fixed capacitor $C_1$ is increased to increase the DC current $I_1$. The influence exerted on the DC current $I_2$ by the variation of the DC current $I_1$ can be expressed by the following equation:

$$(I_1+I_2) = g_m \cdot V_{GS} = g_m \cdot R_k \cdot I_2$$

$$I_2 = I_1/(g_m \cdot R_k - 1).$$

Here, $g_m$ is the mutual conductance of the FET $T_1$.

For the main application of a circuit arrangement according to the present invention, the resistor $R_k$ is selected to be on the order of over ten kilo-ohms, and the mutual conductance $g_m$ is in the order of several millimho, so that the product $g_m \cdot R_k$ is on the order of 20 to 30. As a consequence, the variation of the DC current $I_2$ due to the variation of the DC current $I_1$ becomes small enough to be practically negligible. Consequently, even if the variable capacitor $C_2$ is varied, the DC current $I_2$ flowing through the capacitor $C_2$ is kept substantially at a constant value by the operation of the FET $T_1$. If this constant current is assumed to be $I_k$, the following equation can be derived from equation (12):

$$I_k = I_2 = C_2 \cdot f \cdot [V_{p-p} - (V_{DS}+V_{GS}+V_1)].$$

Further, the following equation can be derived by modifying this equation:

$$f[V_{p-p} - (V_{DS}+V_{GS}+V_1)] = I_k/C_2 \qquad (15).$$

The following equation (16) is obtained by substituting equation (14) by equation (15):

$$I_k(R_1+r_1)(C_1-C_2)/C_2 + I_k \cdot r_1 \cdot r_1/(r_1+R_f+R_0) = I \cdot R_0 \cdot r_1/(r_1+R_f+R_0) \qquad (16).$$

On the other hand, the pair of capacitors $C_1$ and $C_2$ are expressed as follows, for instance, in the case of FIGS. 4A and 4B:

$$C_1 = \epsilon A/d \qquad (17)$$

$$C_2 = \epsilon A/(d+\Delta d) \qquad (18).$$

When equation (16) is substituted by equations (17) and (18) so as to obtain the relation between the mechanical displacement $\Delta d$ corresponding to the load and the output current I, the following equation can be obtained as mentioned above:

$$(C_1-C_2)/C_2 = \Delta d/d.$$

Consequently, the following equation is obtained:

$$I_k \cdot (R_1+r_1)\Delta d/d + I_k \cdot r_1 \cdot r_1/(r_1+R_f+R_0) = I \cdot R_0 \cdot r_1/(r_1+R_f+R_0)$$

By modifying this equation, the following equation is obtained:

$$I = I_k r_1/R_0 + [I_k(R_1+r_1)(r_1+R_f+R_0)/(R_0 r_1)]\Delta d/d \qquad (19).$$

In this equation (19), the first term of the right side is a constant, and the portion in [] of the second term and d are constants also, so that the output current I becomes proportional to the mechanical displacement $\Delta d$. Further, it is possible to adjust the initial value of the output current I to zero by the operation of the zero adjusting circuit consisting of the FET $T_2$ and the resistors $R_2$ and $R_z$, as mentioned above with reference to FIG. 2.

This embodiment of a displacement converting circuit arrangement according to the present invention is primarily applicable to a two line type signal transmitter. As the two line type signal transmitter, a conversion output range adjusting circuit such as mentioned above with reference to FIG. 2 and the above-mentioned zero adjusting circuit are provided to standardize the range of variation of the output signal, namely, the conversion output current from 4 mA to 20 mA or 10 mA to 50 mA when the input signal, namely, the mechanical displacement varies within the range from 0% to 100%.

As is apparent from the above explanation, in a displacement converting circuit arrangement according to the present invention shown in FIG. 6, the one capacitor $C_1$ of the pair of capacitors $C_1$ and $C_2$ for converting the mechanical displacement to the electric signal is fixed at a constant value, and the other variable capacitor $C_2$ is arranged at the outermost side to which the pressure caused by the external load is applied directly, so that the movable electrode 6 of the variable capacitor $C_2$ can be so constructed that the movable electrode 6 withstands the very heavy load in comparison with the conventional circuit arrangement. Accordingly, a displacement converting circuit arrangement according to the invention is widely applicable to liquid level detection by a displacer, load cell or the like.

Figure 7:
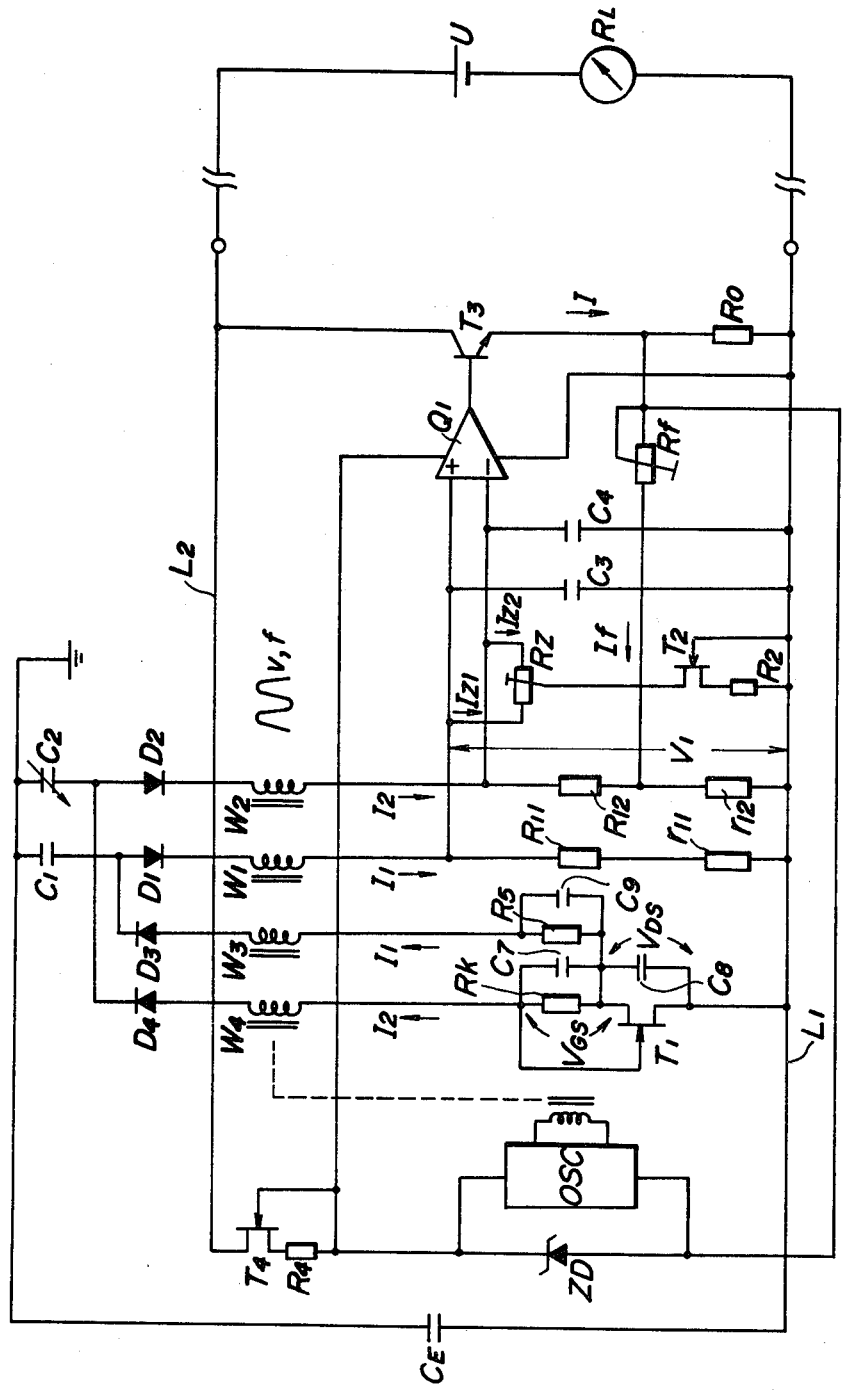
FIG. 7 is a circuit diagram showing a modification of the circuit arrangement shown in FIG. 6.

Another embodiment of a displacement converting circuit arrangement according to the present invention, in which the pair of capacitors arranged as shown in FIGS. 4A and 4B and FIGS. 5A and 5B, is shown in FIG. 7. The portions in FIG. 7 which are similar to those in FIG. 6 are denoted by the same reference numerals and the explanations of those portions will be omitted. In this embodiment, the series connection of the secondary winding $W_3$ and the FET $T_1$ is arranged between the power source lines $L_1$ and $L_2$ in an order opposite to that of FIG. 6. For that purpose, the secondary winding $W_3$ and a further secondary winding $W_4$ are connected respectively with the individual diodes $D_3$ and $D_4$. The secondary winding $W_4$ is connected to the source of the FET $T_1$ through the parallel connection of the resistor $R_k$ and the capacitor $C_7$. The gate of the FET $T_1$ is connected to the connection point between the secondary winding $W_4$ and the parallel connection of the resistor $R_k$ and the capacitor $C_7$. The capacitor $C_8$ is connected between the source and the drain of the FET $T_1$. The secondary winding $W_3$ is connected to the source of the FET $T_1$ through the parallel connection of the resistor $R_5$ and the capacitor $C_9$.

In the embodiment shown in FIG. 6, the AC voltage derived from the secondary winding $W_3$ is rectified and smoothed by the diode $D_5$ and the capacitor $C_6$, and the thus obtained DC voltage is used for the power source of the differential amplifier $Q_1$. On the other hand, in the embodiment shown in FIG. 7, the constant DC voltage derived from the Zener diode ZD is used for the power source of the differential amplifier $Q_1$. When it is desired to widen the dynamic range of the differential amplifier $Q_1$, the circuit arrangement shown in FIG. 6 may be used for the power source of the differential amplifier $Q_1$. In that case, however, ripples exist in the power source voltage. In addition, in the embodiment shown in FIG. 6, the current consumed in the differential amplifier $Q_1$ is multiplied by the winding ratio n between the primary winding and the secondary winding $W_3$ of the output transformer of the oscillator OSC, so that the operation current of the whole circuit arrangement, which should be less than 4 mA when the minimum value of the output signal is in a range from 4 mA to 20 mA, is increased. In contrast, in the embodiment shown in FIG. 7, although the dynamic range is narrowed, ripples do not exist in the power source voltage, and the operation current of the whole circuit arrangement is reduced in comparison with that in FIG. 6.

Furthermore, while in the embodiment shown in FIG. 6, the rectified output current derived from the secondary winding $W_3$ is supplied to the FET $T_2$ of the zero adjusting circuit, in the embodiment shown in FIG. 7, the DC currents $I_1$ and $I_2$ derived respectively from the secondary windings $W_1$ and $W_2$ are supplied not only to the detection resistors $R_{11}$ and $r_{11}$, and the resistors $R_{12}$ and $r_{12}$, but also to the zero adjusting circuit. In the embodiment shown in FIG. 6, the current $n(I_{z1}+I_{z2})$ is the operation current of the zero adjusting circuit, so that the whole operation current becomes large. However, the voltage applied to the FET $T_2$ can be increased, so that the FET $T_2$ itself can be operated in a sufficiently stable region. On the other hand, in the embodiment shown in FIG. 7, the zero adjusting circuit is operated in the range of the voltage appearing across the resistors $R_{11}$ and $r_{11}$, and the resistors $R_{12}$ and $r_{12}$, so that this embodiment is disadvantageous in comparison with the embodiment shown in FIG. 6 as far as the dynamic range of the FET $T_2$ is concerned, but this embodiment can be operated without the increase of the operation current of the zero adjusting circuit.

In addition, the conversion equation in which the zero adjusting currents $I_{z1}$ and $I_{z2}$ are involved can be obtained as equation (3)' described earlier for the embodiment shown in FIG. 6. The conversion equation in the case of the embodiment shown in FIG. 7 is obtained as equation (3)".

Further, while in the above explanation the capacitance of the capacitor is varied in response to the mechanical displacement to be measured, the same function and the same effect can be naturally obtained also in the case where the impedance of the impedance element of other type such as an inductance element, a resistor element or the like is varied in response to the mechanical displacement. In this case, the DC currents $I_1$ and $I_2$ are inversely proportional to the inductance, the resistance or the like.

What is claimed is:

1. A displacement converting circuit arrangement comprising:
   first and second impedance elements, the impedance of at least one of said elements being variable in response to a mechanical displacement thereof;
   means for deriving first and second DC currents, said first and second DC currents being proportional to the impedances of said first and second impedance elements, respectively;
   means for deriving a current corresponding to the sum of said first and second DC currents;
   a field effect transistor having said current corresponding to the sum of said first and second DC currents flowing between its source and drain electrodes, said field effect transistor maintaining said sum current at a constant value;
   means for maintaining at least one of said first and second DC currents at a fixed amount;
   a differential amplifier having first and second input terminals and an output terminal, said first and second DC currents being supplied to the first and second input terminals respectively of said differential amplifier; and
   an output transistor coupled to the output terminal of said differential amplifier, the current at the output of said output transistor corresponding to the difference between said first and second DC currents, said output current indicating the magnitude of said mechanical displacement.

2. A displacement converting circuit arrangement as claimed in claim 1, wherein said first and second impedance elements include first and second opposed fixed electrodes and a movable electrode interposed between said fixed electrodes, said movable electrode and said first fixed electrode forming a first capacitor corresponding to said first impedance element and said movable electrode and said second fixed electrode forming a second capacitor corresponding to said second impedance element; said displacement converting circuit arrangement further comprising
   first and second diodes connected to said first and second capacitors respectively with a first polarity, a half wave of an alternating current signal being applied to said first and second capacitors through said first and second diodes to produce said first and second DC currents;

third and fourth diodes connected to said first and second capacitors respectively with a second polarity opposite to that of said first polarity, the opposite half wave of said alternating current signal being applied to said first and second capacitor through said third and fourth diodes;

first and second resistors for receiving said first and second DC currents, the voltages across said first and second resistors being coupled respectively to the first and second input terminals of said differential amplifier; and a third resistor coupled between the source and gate electrodes of said field effect transistor, said sum current flowing through said third resistor.

3. A displacement converting circuit arrangement as claimed in claim 1, wherein a zero adjusting circuit is connected to the first and second input terminals of said differential amplifier, said output current being adjusted to a predetermined value in accordance with the impedances of said first and second impedance elements.

4. A displacement converting current arrangement as claimed in claim 3, wherein said zero adjusting circuit comprises a differential resistor having first and second ends connected to the first and second input terminals of said differential amplifier and an adjusting terminal between said first and second ends; a second field effect transistor; and a self-biasing resistor coupling said second field effect transistor to the adjusting terminal of said differential resistor, whereby a zero adjusting current is supplied to said second field effect transistor.

5. A displacement converting circuit arrangement as claimed in claim 1, which further comprises a load resistor coupled to the output of said output transistor, a detection resistor coupled to an input terminal of said differential amplifier and a variable feed back resistor coupled between said load and detection resistors, a part of said output current being fed back to said detection resistor through said variable feed back resistor, the resistance of said feed back resistor being adjusted to provide a predetermined output current range corresponding to that of said mechanical displacement.

6. A displacement converting circuit arrangement as claimed in claim 5, wherein the resistances of said load resistor and said detection resistor are such that the current through said variable feed back resistor is substantially zero at at least one end of said output current range.

7. A displacement converting circuit arrangement as claimed in claim 5, wherein said first and second impedance elements include first and second opposed fixed electrodes and a movable electrode interposed between said fixed electrodes, said movable electrode and said first fixed electrode forming a first capacitor corresponding to said first impedance element and said movable electrode and said second fixed electrode forming a second capacitor corresponding to said second impedance element; said displacement converting circuit arrangement further comprising first and second diodes connected to said first and second capacitors respectively with a first polarity, a half wave of an alternating current signal being applied to said first and second capacitors through said first and second diodes to produce said first and second DC currents;

third and fourth diodes connected to said first and second capacitors respectively with a second polarity opposite to that of said first polarity, the opposite half wave of said alternating current signal being applied to said first and second capacitors through said third and fourth diodes;

first and second resistors for receiving said first and second DC currents, said detection resistor forming part of said second resistor, the voltages across said first and second resistors being coupled to the first and second input terminals of said differential amplifier; and a third resistor coupled between the source and gate electrodes of said field effect transistor, said sum current flowing through said third resistor.

8. A displacement converting circuit arrangement as claimed in claim 1, wherein only said second impedance element is varied in response to said mechanical displacement.

9. A displacement converting circuit arrangement as claimed in claim 8, wherein a zero adjusting circuit is connected to the first and second input terminals of said differential amplifier, said output current being adjusted to a predetermined value in accordance with the impedances of said first and second impedance elements.

10. A displacement converting circuit arrangement as claimed in claim 8, which further comprises a load resistor coupled to the output of said output transistor, a detection resistor coupled to an input terminal of said differential amplifier and a variable feed back resistor coupled between said load and detection resistors, a part of said output current being fed back to said detection resistor through said variable feed back resistor, the resistance of said feed back resistor being adjusted to provide a predetermined output current range corresponding to that of said mechanical displacement.

11. A displacement converting circuit arrangement as claimed in claim 10, wherein the resistances of said load resistor and said detection resistor are such that the current through said variable feed back resistor is substantially zero at at least one end of said output current range.

12. A displacement converting circuit arrangement as claimed in claim 8, wherein said first and second impedance elements comprise first and second fixed electrodes and said second impedance element comprises one of said fixed electrodes and a movable electrode, said fixed electrodes forming a first capacitor corresponding to said first impedance element and said one fixed electrode and said movable electrode forming a second capacitor corresponding to said second impedance element; said displacement converting circuit arrangement further comprising first and second diodes connected to said first and second capacitors respectively with a first polarity, a half wave of an alternating current signal being applied to said first and second capacitors through said first and second diodes to produce said first and second DC currents;

third and fourth diodes connected to said first and second capacitors respectively with a second polarity opposite to that of said first polarity, the opposite half wave of said alternating current signal being applied to said first and second capacitor through said third and fourth diodes;

first and second resistors for receiving said first and second DC currents, the voltages across said first and second resistors being coupled to the first and second input terminals of said differential amplifier; and a third resistor coupled between the source and gate electrodes of said field effect transistor, said sum current flowing through said third resistor.

13. A displacement converting circuit arrangement as claimed in claim 9, wherein said zero adjusting circuit comprises a differential resistor having first and second ends connected to the first and second input terminals of said differential amplifier and an adjusting terminal between said first and second ends; a second field effect transistor; and a self-biasing resistor coupling said second field effect transistor to the adjusting terminal of said differential resistor, whereby a sum adjusting current is supplied to said second field effect transistor.

14. A displacement converting circuit arrangement as claimed in claim 10, wherein said first and second impedance elements comprise first and second fixed electrodes and said second impedance element comprises one of said fixed electrodes and a movable electrode, said fixed electrodes forming a first capacitor corresponding to said first impedance element and said one fixed electrode and said movable electrode forming a second capacitor corresponding to said second impedance element; said displacement converting circuit arrangement further comprising first and second diodes connected to said first and second capacitors respectively with a first polarity, a half wave of an alternating current signal being applied to said first and second capacitors through said first and second diodes to produce said first and second DC currents;

third and fourth diodes connected to said first and second capacitors respectively with a second polarity opposite to that of said first polarity, the opposite half wave of said alternating current signal being applied to said first and second capacitors through said third and fourth diodes;

first and second resistors for receiving said first and second DC currents, the voltages across said first and second resistors being coupled to the first and second input terminals of said differential amplifier; and a third resistor coupled between the source and gate electrodes of said field effect transistor, said sum current flowing through said third resistor, a part of the output current of said differential amplifier being fed back to one of said first and second resistors through said variable resistor.

* * * * *